3,205,132
ROOT CANAL SEALING COMPOSITIONS
Benjamin F. Gurney, Glen Ellyn, Ill., assignor to Loyola University, Chicago, Ill., a corporation of Illinois, not for profit
No Drawing. Filed June 17, 1963, Ser. No. 288,436
3 Claims. (Cl. 167—60)

This invention relates to a root canal sealing composition for use by dentists and oral surgeons in the treatment of dental root canals.

An object of the invention is to provide a new and improved root canal sealing composition for use by dentists and oral surgeons incidental to dental operations.

Another object of the invention is to provide a new and improved root canal sealing composition which has more effective fungicidal and bactericidal properties than root canal sealing compositions heretofore known while, at the same time, having no objectionable side reactions in use.

Other objects will appear hereinafter.

In the practice of the invention I may prepare the new root canal sealing composition in accordance with any of the following examples:

EXAMPLE NO. 1

(a) Solid phase

| | Gm. |
|---|---|
| Calcium hydroxide | 24.0 |
| Precipitated silver | 1.0 |
| Barium sulphate | 6.0 |
| Para-aminotoluene sulfonamide hydrochloride | 20.0 |
| Zinc oxide | 49.0 |

(b) Liquid phase

| | Ml. |
|---|---|
| Eugenol (2-methoxy allyl phenol or 4-allyl guaiacol) | 95.0 |
| NMFE (5-nitro-2-methylfurfuryl ether) | 4.0 |
| Zinc acetate (dissolved in the eugenol and NMFE | 1 |

In preparing a typical form of the new root canal sealing composition from the solid phase and the liquid phase components set forth in the foregoing Example No. 1, the liquid phase component may be intimately mixed with the solid phase component within a range of from not substantially less than thirty-five (35) percent nor substantially more than forty-five (45) percent, by weight, of the solid phase component.

The new root canal sealing composition, prepared in accordance with the foregoing Example No. 1, is in the form of a paste but sets to a firm, hard composition when introduced into the root canal.

Other examples which may be followed in preparing the new root canal sealing composition are as follows:

EXAMPLE NO. 2

(a) Solid phase

| | Gm. |
|---|---|
| Calcium hydroxide | 24.0 |
| Barium sulphate | 6.0 |
| Para-aminotoluene sulfonamide (free base) | 20.0 |
| Zinc oxide | 50.0 |

(b) Liquid phase

| | | |
|---|---|---|
| Eugenol (2-methoxy allyl phenol or 4-allyl guaiacol) | ml | 93.0 |
| NMFE (5-nitro-2-methylfurfuryl ether | ml | 3.0 |
| Zinc acetate (dissolved in the eugenol and NMFE) | gm | 1 |
| Canada balsam | ml | 2.0 |
| Oil of wintergreen | ml | 1 |

The new root canal sealing composition prepared in accordance with the foregoing Example No. 2 has a cream-like consistency.

EXAMPLE NO. 3

(a) Solid Phase

| | Gm. |
|---|---|
| Calcium hydroxide | 5.0 |
| Zinc oxide | 55.0 |
| Bismuth subcarbonate | 10.0 |
| Para-aminotoluene sulfonamide (free base) | 7.5 |
| Para-aminotoluene sulfonamide (hydrochloride) | 7.5 |
| Rosin powder | 15.0 |

(b) Liquid phase

| | | |
|---|---|---|
| Eugenol (2-methoxy allyl phenol or 4-allyl guaiacol) | ml | 50.0 |
| NMFE (5-nitro-2-methylfurfuryl ether) | ml | 4.0 |
| Zinc acetate (dissolved in the eugenol and NMFE) | gm | 5 |
| Canada balsam | ml | 2.0 |
| Odorant (oil of wintergreen) | ml | 4.0 |
| Paraffin oil | ml | 35.0 |

The new root canal sealing composition prepared as in Example No. 3, is quite soft and easy to use and has a consistency which is between the paste-like form of the composition of Example No. 1 and the cream-like form of the composition of Example No. 2, but sets to a firm, hard composition when introduced into the root canal.

Other forms of the new root canal sealing composition may be prepared in accordance with the following examples:

EXAMPLE NO. 4

(a) Solid phase

| | Gm. |
|---|---|
| Calcium hydroxide | 10.0 |
| Barium sulphate | 20.0 |
| Para-aminotoluene sulfonamide (free base) | 15.0 |
| Zinc oxide | 50.0 |
| Rosin powder | 5.0 |

(b) Liquid phase

| | | |
|---|---|---|
| Eugenol (2-methoxy allyl phenol or 4-allyl guaiacol) | ml | 50.0 |
| NMFE (5-nitro-2-methylfurfuryl ether) | ml | 4.0 |
| Zinc acetate (dissolved in the eugenol and NMFE) | gm | 2 |
| Metacresylacetate (plasticizing agent) | ml | 33.0 |
| Canada balsam | ml | 10.0 |
| Oil of wintergreen | ml | 1.0 |

EXAMPLE NO. 5

(a) Solid phase

| | Gm. |
|---|---|
| Calcium hydroxide | 10.0 |
| Barium sulphate | 20.0 |
| Para-aminotoluene sulfonamide (hydrochloride) | 15.0 |
| Zinc oxide | 50.0 |
| Rosin powder | 4.0 |
| Precipitated silver | 1.0 |

(b) Liquid phase

| | | |
|---|---|---|
| Eugenol (2-methoxy allyl phenol or 4-allyl guaiacol) | ml | 50.0 |
| NMFE (5-nitro-2-methylfurfuryl ether) | ml | 4.0 |
| Zinc acetate (dissolved in the eugenol and NMFE) | gm | 1 |
| Metacresylacetate (plasticizing agent) | ml | 45.0 |

EXAMPLE NO. 6

(a) *Solid phase*

| | Gm. |
|---|---|
| Para-aminotoluene sulfonamide (hydrochloride) | 20.0 |
| Zinc oxide | 60.0 |
| Bismuth subcarbonate | 20.0 |

(b) *Liquid phase*

| | | |
|---|---|---|
| Eugenol (2-methoxy allyl phenol or 4-allyl guaiacol) | ml | 95.0 |
| NMFE (5-nitro-2-methylfurfuryl ether) | ml | 4.0 |
| Zinc acetate (dissolved in the eugenol and NMFE) | gm | 1.0 |

EXAMPLE NO. 7

(a) *Solid phase*

| | | |
|---|---|---|
| Para-aminotoluene sulfonamide (free base) | gm | 15.0 |
| Zinc oxide | gm | 85.0 |

(b) *Liquid phase*

| | | |
|---|---|---|
| Eugenol (2-methoxy allyl phenol or 4-allyl guiacol) | ml | 95.0 |
| NMFE (5-nitro-2-methylfurfuryl ether) | ml | 4.0 |
| Zinc acetate (dissolved in the eugenol and NMFE) | gm | 1.0 |

EXAMPLE NO. 8

(a) *Solid phase*

| | Gm. |
|---|---|
| Zinc oxide | 80.0 |
| Para-aminotoluene sulfonamide (free base) | 15.0 |
| Zinc acetate | 5.0 |

(b) *Liquid phase*

| | Ml. |
|---|---|
| Eugenol (2-methoxy allyl phenol or 4-allyl guaiacol) | 96.0 |
| NMFE (5-nitro-2-methylfurfuryl ether) | 4.0 |

EXAMPLE NO. 9

(a) *Solid phase*

| | Gm. |
|---|---|
| Para-aminotoluene sulfonamide (hydrochloride) | 20.0 |
| Zinc oxide | 79.0 |
| Zinc acetate | 1.0 |

(b) *Liquid phase*

| | Ml. |
|---|---|
| Eugenol (2-methoxy allyl phenol or 4-allyl guaiacol) | 91.0 |
| NMFE (5-nitro-2-methylfurfuryl ether) | 4.0 |
| Canada balsam | 5.0 |

In all of the foregoing Examples Nos. 1 to 9, inclusive, the para-aminotoluene sulfonamide free base and the para-aminotoluene sulfonamide hydrochloride may be used interchangeably in equivalent amounts and, if desired, mixtures of these materials may also be employed.

In the solid phase component of the new root canal sealing composition, as prepared in accordance with the foregoing examples, the calcium hydroxide, when used, serves as an inert vehicle and the barium sulphate, when used, imparts some degree of X-ray opacity to the composition. The precipitated silver component is believed to enhance the bactericidal properties of the composition and increases the adhesiveness of the resulting composition. The zinc oxide component of the solid phase reacts with the eugenol to harden the material. The para-aminotoluene sulfonamide hydrochloride, or para-aminotoluene sulfonamide free base, or a mixture of these materials, is the active ingredient of the solid phase component and lends bactericidal character to the new root canal sealing composition. The bismuth subcarbonate, where used, in the solid phase of the composition lends X-ray opacity to the composition and enhances its capacity for identification on X-ray film.

The zinc acetate, whether employed in the solid phase or in the liquid phase of the composition serves as an accelerator to expedite the reaction between the zinc oxide and the eugenol and hence decreases the hardening time of the composition in the root canal. The rosin powder, where used, in the solid phase of the composition increases the adhesiveness of the composition.

The 5-nitro-2-methylfurfuryl ether ingredient of the liquid phase component cooperates with the para-aminotoluene sulfonamide hydrochloride of the solid phase component to impart effective fungicidal and bactericidal characteristics to the new root canal sealing composition.

In preparing the new root canal sealing composition, the para-aminotoluene sulfonamide component of the solid phase of the composition should be not substantially less than fifteen (15) percent, nor substantially more than twenty (20) percent, by weight, of the solid phase of the composition although the composition possesses some therapeutic characteristics when the percentage of the para-aminotoluene sulfonamide component is slightly less than fifteen (15) percent, by weight, of the solid phase of the composition. Moreover, no advantage is obtained in increasing the para-aminotoluene sulfonamide component above twenty (20) percent of the solid phase of the composition.

The zinc oxide component of the solid phase of the composition may be employed within a range of from not substantially less than fifty (50) percent to not substantially more than eighty-five (85) percent, by weight, of the solid phase of the composition.

The percentages of the other ingredients of the solid phase component of the new composition may be varied substantially without detracting from the desirable therapeutic characteristics of the new root canal sealing composition.

The eugenol component of the liquid phase of the new root canal sealing composition may be employed within a range of from not substantially less than fifty (50) percent to not substantially more than ninety-six (96) percent, volume, of the liquid phase component.

The NMFE (5-nitro-2-methylfurfuryl ether) may be employed within a range of from not substantially less than three (3) percent to not substantially more than four (4) percent, by volume, of the liquid phase component of the new root canal sealing composition since if the NMFE is employed in the liquid phase component below three (3) percent, by volume, of the liquid phase component it does not impart adequate therapeutic properties to the new root canal sealing composition whereas, on the other hand, if the NMFE is employed in a quantity substantially greater than four (4) percent, by volume, of the liquid phase component of the composition, it may tend to stain the teeth of the patient and hence be clinically unacceptable.

The zinc acetate, when employed in the solid phase component may be employed within a range of from not substantially less than one (1) percent to not substantially more than five (5) percent, by weight, of the solid phase component and when employed in the liquid phase component should be employed within a range of from not substantially less than one (1) percent to not substantially more than five (5) percent, by volume, of the liquid phase component.

It will be noted that the zinc acetate employed in the new root canal sealing composition may be employed in solid form in the solid phase of the composition or is dissolved in the eugenol and NMFE in the liquid phase of the composition. In the latter case the zinc acetate is placed in a mortar with the eugenol and NMFE and worked into a solution with a pestle, although, of course, other procedures may be followed for dissolving the zinc acetate in the eugenol and NMFE ingredients of the liquid phase of the composition.

When employed in the solid phase of the new composition the zinc acetate should be employed within a range from not substantially less than one percent (1%) to not substantially more than five percent (5%), by weight, of the solid phase component of the new root canal sealing composition and when employed in the liquid phase the zinc acetate component should be employed within a range of not substantially less than approximately one percent (1%) to not substantially more than approximately five percent (5%), by volume, of the liquid phase component although the quantities of zinc acetate specified, in terms of grams, in the liquid phase component are slightly less than the quantities required to give the same percentages in terms of mls. or by volume of the liquid phase component.

I have found in the practice of the present invention that the same provides a new and improved root canal sealing composition which is readily prepared and sets to a firm hard composition in the root canal, and has highly effective therapeutic fungicidal and bactericidal characteristics while, at the same time, having no harmful or deleterious side effects.

It will thus be seen from the foregoing description that the present invention provides a new and improved root canal sealing composition having the desirable advantages and characteristics and accomplishes its intended objects including those hereinbefore pointed out and others which are inherent in the invention.

I claim:

1. A non-aqueous base therapeutic root canal sealing composition in the form of a paste comprised of an intimate mixture of a solid phase and a liquid phase, the solid phase being present in the composition within a range of from not substantially less than sixty-seven (67) to seventy-six (76) percent, by weight, of the composition, the liquid phase being present in the composition within a range of from not substantially less than twenty-four (24) percent to not substantially more than thirty-three (33) percent, by weight, of the composition, the said solid phase being comprised of a major proportion of a finely divided inert material selected from the group consisting of calcium hydroxide, barium sulphate, and bismuth subcarbonate, a material selected from the group consisting of paraaminotoluene sulfonamide hydrochloride and paraaminotoluene sulfonamide free base present in the solid phase within a range from not substantially less than fifteen (15) percent to not substantially more than twenty (20) percent, by weight, of the said solid phase, zinc oxide within a range from not substantially less than fifty (50) percent to not substantially more than eighty-five (85) percent, by weight, of the said solid phase, the said liquid phase being comprised of eugenol within a range of from not substantially less than fifty (50) percent to not substantially more than ninety-six (96) percent, by volume, of the said liquid phase, and the said 5-nitro-2-methylfurfuryl ether being present within a range of not substantially less than three (3) percent to not more than four (4) percent, by volume, of the said liquid phase, and zinc acetate within a range of from not substantially less than one (1) percent to not substantially more than five (5) percent, by weight, of the said solid phase.

2. A therapeutic root canal sealing composition as defined in claim 1 in which the said solid phase thereof includes a minor proportion of precipitated silver.

3. A non-aqueous base therapeutic root canal sealing composition in the form of a paste comprised of an intimate mixture of a solid phase and a liquid phase, the solid phase being present in the composition within a range of from not substantially less than sixty-seven (67) to seventy-six (76) percent, by weight, of the composition, the liquid phase being present in the composition within a range of from not substantially less than twenty-four (24) percent to not substantially more than thirty-three (33) percent, by weight, of the composition, the said solid phase being comprised of a major proportion of a finely divided inert material selected from the group consisting of calcium hydroxide, barium sulphate, and bismuth subcarbonate, a material selected from the group consisting of paraaminotoluene sulfonamide hydrochloride and paraaminotoluene sulfonamide free base present in the solid phase within a range from not substantially less than fifteen (15) percent to not substantially more than twenty (20) percent, by weight of the said solid phase, zinc oxide within a range from not substantially less than fifty (50) percent to not substantially more than eighty-five (85) percent, by weight, of the said solid phase, the said liquid phase being comprised of eugenol within a range of from not substantially less than fifty (50) percent to not substantially more than ninety-six (96) percent, by volume, of the said liquid phase, 5-nitro-2-methylfurfuryl ether present within a range of not substantially less than three (3) percent to not more than four (4) percent, by volume, of the said liquid phase, and zinc acetate in the liquid phase within a range of not substantially less than one (1) percent to not substantially more than five (5) percent, by volume, of the liquid phase.

References Cited by the Examiner

UNITED STATES PATENTS 2,927,056  3/60  Gurney _____ 167—70

OTHER REFERENCES

Accepted Dental Remedies, 28th Ed., published by the American Dental Association, Chicago, 1963, pages 168, 169 and 171.

Royhouse, Materials in Dentistry, published by Year Book Medical Publishers, Inc., Chicago, 1962, pages 102 and 103.

LEWIS GOTTS, *Primary Examiner.*

FRANK CACCIAPAGLIA, JR., *Examiner.*